F. E. WHITE.
CLAMP FOR PIPE LINES.
APPLICATION FILED MAY 18, 1915.

1,182,607.

Patented May 9, 1916.

Inventor:
Fred E. White.

UNITED STATES PATENT OFFICE.

FRED E. WHITE, OF GARDNER, MASSACHUSETTS, ASSIGNOR TO CENTRAL OIL AND GAS STOVE CO., OF GARDNER, MASSACHUSETTS, A CORPORATION OF MASSACHUSETTS.

CLAMP FOR PIPE-LINES.

1,182,607.

Specification of Letters Patent.   Patented May 9, 1916.

Application filed May 18, 1915. Serial No. 28,921.

*To all whom it may concern:*

Be it known that I, FRED E. WHITE, citizen of the United States, residing at Gardner, Massachusetts, have invented certain new and useful Improvements in Clamps for Pipe-Lines, of which the following is a specification.

My invention is designed to simplify the support or clamp for the manifold pipe of a gas stove, and consists principally in forming an integral clip upon the pipe and utilizing this clip to secure the pipe to the ordinary supporting bracket instead of having the bracket provided with means for encircling the pipe, as is the common practice now.

Figure 1:
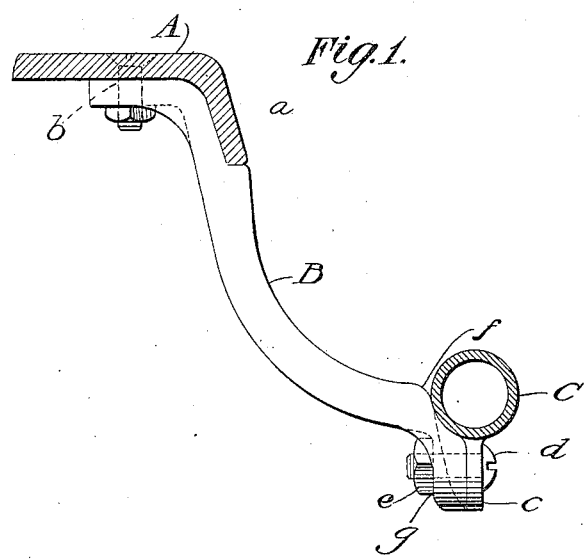
Figure 2:
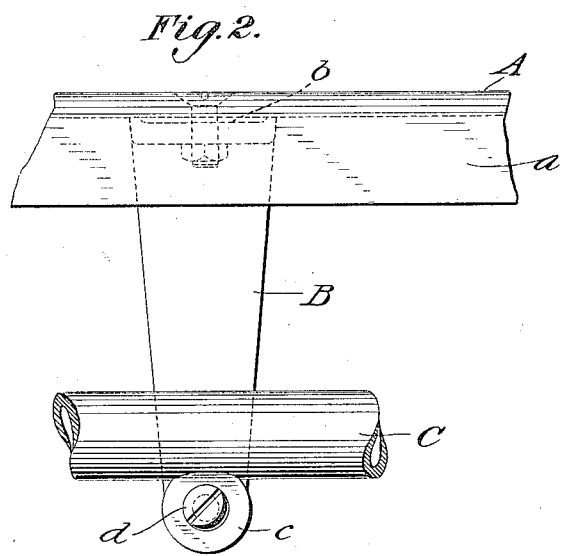

In the accompanying drawing in Figure 1 I have shown one view of my invention in partial side elevation to the pipe and a part of the stove in section, and Fig. 2 is a front elevation of a part of the pipe, the ends being broken away and a part of the stove frame being shown in elevation.

In these figures, an ordinary type of gas stove is shown at A, having the usual depending flange $a$, and the usual bracket B is fitted beneath the frame and flange, as shown in Fig. 1, being bolted thereto, as at $b$, in the ordinary way.

Instead of, as is usual and common, having the end of the bracket provided with holding means which encircle the pipe, I very greatly simplify the construction by providing the pipe C with a clip $c$ preferable welded thereto or secured in any suitable manner, and this simple connection forms the means for supporting the pipe from the bracket by means of a bolt $d$ and nut $e$. The assembling of the parts is simplified; there can be no mistake as to the relation of the parts in bringing them together, and they can be as readily detached, when desired, for any purpose.

The bracket, it will be observed, at its lower end is slightly concaved at $f$, and forms a support for the side of the pipe, while the rear face of the bracket is slightly flattened, as at $g$, to form a seat for the nut, the front face of the bracket fitting snugly against the face of the clip.

I claim as my invention:

In combination with the bracket having a seat near its lower end and a depending portion below said seat, a pipe line, a clip on said line adapted to be secured to the end of the clamp, the pipe being also supported by the clamp above the position of the clip, substantially as described.

In testimony whereof, I affix my signature in presence of two witnesses.

FRED E. WHITE.

Witnesses:
 I. L. SIMENSON,
 H. C. BATES.

Copies of this patent may be obtained for five cents each, by addressing the "Commissioner of Patents, Washington, D. C."